United States Patent
McCullough et al.

(10) Patent No.: US 6,858,976 B2
(45) Date of Patent: Feb. 22, 2005

(54) SPRING-CLIP FOR HID LAMP

(75) Inventors: Ebon McCullough, New Ipswich, NH (US); David J. Lamprey, Jr., Bow, NH (US)

(73) Assignee: Osram Sylvania Inc., Danvers, MA (US)

(*) Notice: Subject to any disclaimer, the term of this patent is extended or adjusted under 35 U.S.C. 154(b) by 225 days.

(21) Appl. No.: 10/324,382

(22) Filed: Dec. 19, 2002

(65) Prior Publication Data

US 2004/0119393 A1 Jun. 24, 2004

(51) Int. Cl.[7] .................................................. H01J 5/48
(52) U.S. Cl. ............................... 313/318.09; 313/318.1
(58) Field of Search ......................... 313/318.09, 318.1; 248/205.1, 316, 694; 362/440, 549, 191, 396; 403/155, 12, 327, 256, 397

(56) References Cited

U.S. PATENT DOCUMENTS 5,339,002 A * 8/1994 Braun et al. ............. 313/318.1
6,781,295 B2 * 8/2004 Dakin et al. ........... 313/318.09

* cited by examiner

Primary Examiner—Nimeshkumar D. Patel
Assistant Examiner—Sharlene Leurig
(74) Attorney, Agent, or Firm—William E. Meyer

(57) ABSTRACT

An assembly (10) for a lamp. The assembly 10 includes a light source (12) having a center chamber (14) and opposite ends (16, 18), arrayed along a longitudinal axis (19). The ends (16, 18) are cylindrical in cross-section. A tubular shroud (20) surrounds the light source (12) and is coaxial with the longitudinal axis (19). The light source (12) is mounted within the shroud (20) by spring clips (26) one of which is mounted at either end of the shroud. The spring clips each include a base (28) lying in a first plane and having an aperture (30), for example, a star-shaped aperture, centrally located in the base. The apertures (30) in the two spring clips frictionally engage one of the ends (16, 18) of the light source (12). Each of the spring clips (26) has a U-shaped projection (32) at and end (33) of the base (26). The U-shaped projection comprises first and second upstanding walls (34, 36) joined by a first lip (38) that extends in a second plane and is fitted over the wall of the shroud (20). One of the upstanding walls of the U-shaped projection, for example, wall (36), is formed to provide spring tension for grasping the shroud wall.

8 Claims, 2 Drawing Sheets

SPRING-CLIP FOR HID LAMP

TECHNICAL FIELD

This invention relates to lamps and particular to arc discharge lamps. Still more particularly, the invention relates to arc discharge lamps employing a ceramic arc tube, a shield or shroud and mounting means for mounting the arc tube within the shroud.

BACKGROUND ART

Metal halide arc discharge lamps are frequently employed in commercial usage because of their high luminous efficacy and long life. A typical metal halide arc discharge lamp includes a quartz or fused silica arc tube that is hermetically sealed within a borosilicate glass outer envelope. Recent advances in the art have employed a ceramic arc tube constructed, for example, from polycrystalline alumina. It is with the latter type that this invention is particularly concerned. The arc tube, itself hermetically sealed, has tungsten electrodes sealed into opposite ends and contains a fill material that may include mercury, metal halide additives and a rare gas to facilitate starting. In some cases, particularly in high wattage lamps, the outer envelope is filled with nitrogen or another inert gas at less than atmospheric pressure. In other cases, particularly in low wattage lamps, the outer envelope is evacuated.

It has been found desirable to provide metal halide arc discharge lamps with a shroud that comprises a generally tubular, light-transmissive member, such as quartz, that is able to withstand high operating temperatures. The arc tube and the shroud are coaxially mounted within the lamp envelope with the arc tube located within the shroud. Preferably, the shroud is a tube that is open at both ends.

In those lamps using an arc tube made from quartz or fused silica or like material, the arc tube has a generally tubular body sealed at the ends by a pinch seal. The pinch seals provide a flattened area on the arc tube that lends itself to receiving a mounting structure that both positions the arc tube within the shroud or shield and allows the entire structure to be mounted upon a suitable frame within an envelope.

The shroud or shield has several beneficial effects on lamp operation. In lamps with a gas-filled outer envelope, the shroud reduces convective heat losses from the arc tube and thereby improves the luminous output and the color temperature of the lamp. In lamps with an evacuated outer envelope, the shroud helps to equalize the temperature of the arc tube. In addition, the shroud effectively reduces sodium losses and moves the maintenance of phosphor efficiency in metal halide lamps having a phosphor coating on the inside surface of the outer envelope. Finally, the shroud improves the safety of the lamp by acting as a containment device in the event that the arc tube shatters.

In lamps using ceramic arc tubes, mounting the arc tube within a shroud has proven difficult and expensive. The ceramic arc tube has a tubular, often bulbous body with ceramic, cylindrical capillaries extending therefrom. The capillaries are relatively small, often having diameters of 3 mm or so, and contain the electrodes.

DISCLOSURE OF INVENTION

It is, therefore, an object of the invention to obviate the disadvantages of the prior art relating to the mounting of ceramic arc tubes.

It is another object of the invention to enhance the mounting of ceramic arc tubes within a shroud.

Yet another object of the invention is the provision of mounting assembly that has reduced costs.

Still another object of the invention is the provision of an arc tube mounting assembly that can be fabricated with minimum hand-labor.

These objects are accomplished, in one aspect of the invention by an arc tube mount that has a spring clip comprising a base in a first plane and having an aperture centrally located therein. A U-shaped projection is provided at a first end of the base and has first and second upstanding walls. A first lip extends orthogonally between the first wall and second walls in a second plane. A third upstanding wall is formed at the second end of the base and an extension is formed with the third wall and projects away therefrom in the second plane.

In a preferred embodiment of the invention the spring clip is utilized with a shroud by inserting a cylindrical end of a ceramic arc tube into the centrally located aperture of the spring clip where it is frictionally maintained and then mounting the arc tube within a shroud by fitting the U-shaped projection over the edge of the tubular shroud. By forming the U-shaped projection such that it provides a spring tension on the shroud, the arc tube is maintained within the shroud. A second spring clip is provided at the other end of the arc tube and similarly engages the other end of the shroud. In a still further preferred embodiment of the invention, the extension, or a flag formed therewith, is attached to a frame by any of a number of suitable means, as will be described hereinafter.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
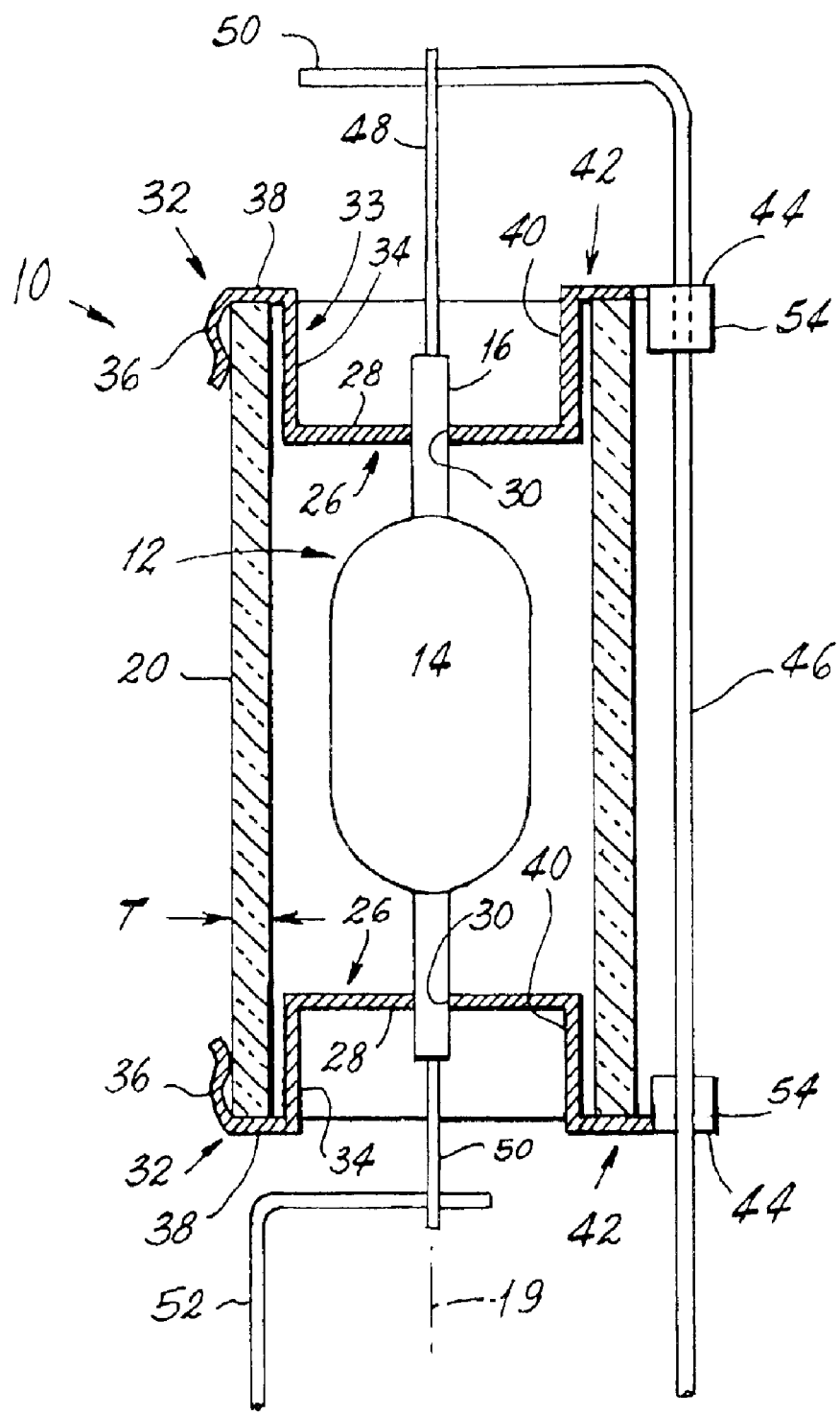
FIG. 1 is an elevational view, partially in section, of an arc tube mounted within a shroud by a spring clip of the invention.
Figure 2:
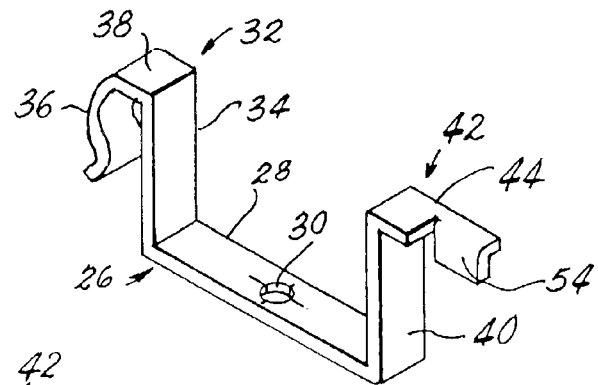
FIG. 2 is a perspective view of the spring clip shown in FIG. 1.

Referring now to the drawings with greater particularity, there is shown in FIG. 1 an assembly 10 for a lamp. The assembly 10 comprises a light source 12 having a center chamber 14 and opposite ends 16, 18, arrayed along a longitudinal axis 19. The ends 16, 18 are cylindrical in cross-section. The light source 12 in this instance is an arc discharge chamber constructed of polycrystalline alumina.

A tubular shroud 20 surrounds the light source 12 and is coaxial with the longitudinal axis 19.

The light source 12 is mounted within the shroud 20 by spring clips 26 one of which is mounted at either end of the shroud. The spring clips each comprise a base 28 lying in a first plane and having an aperture 30, for example, a star-shaped aperture, centrally located in the base. The apertures 30 in the two spring clips frictionally engage one of the ends 16, 18 of the light source 12.

Each of the spring clips 26 has a U-shaped projection 32 at and end 33 of the base 26. The U-shaped projection comprises first and second upstanding walls 34, 36 joined by a first lip 38 that extends in a second plane and is fitted over the wall of the shroud 20. One of the upstanding walls of the U-shaped projection, for example, wall 36, is formed to provide spring tension for grasping the shroud wall.

A third upstanding wall 40 is formed at the second end 42 of the base 28 and is provided with an extension 44 that projects away from the wall 40 in the second plane.

The extensions 44 are attached to a frame 46 thereby mounting the assembly. In the embodiment shown in FIG. 1 the frame 46 can be a part of one of the lamp lead-ins and an electrode 48 exiting from end 16 can be electrically and mechanically attached to an arm 50 of frame 46. A second electrode 50 exiting from end 18 can be electrically and mechanically attached to a second lead-in 52.

In the embodiment shown in FIG. 1 a flag 54 is formed with the extension 44 and extends away from the extension 44 in a plane transverse to the first and second planes and it is the flag 54 that is attached to the frame.

Alternate embodiments of the second end 42 are shown in FIGS. 3–6.

Figure 3:
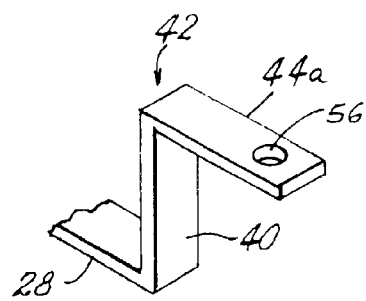
FIG. 3 is a partial perspective view of an alternate embodiment of a spring clip.

Referring now to FIG. 3, second end 42 of a spring clip 26 has an extension 44a elongated and provided with a frame-receiving aperture 56 to be pressed over a wire frame 46.

Figure 4:
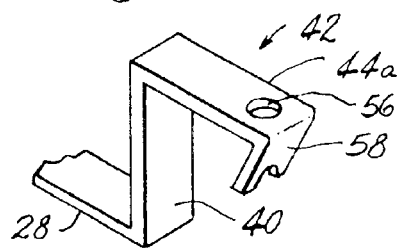
FIG. 4 is a partial perspective view of yet another alternate embodiment of a spring clip.

The embodiment shown in FIG. 4 includes a tension member 58 formed to project inwardly toward the frame 46 and apply pressure thereto to maintain the assembly 10 in position on the frame 46.

Figure 5:
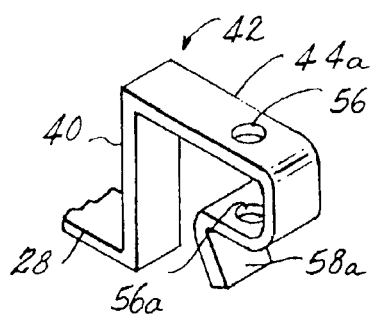
FIG. 5 is a partial perspective view of still another alternate embodiment of a spring clip.

In the embodiment shown in FIG. 5 a second aperture 56a is provided spaced from but aligned with the first aperture 56. A tension member 58a can also be provided.

Figure 6:
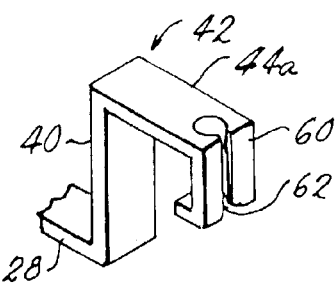
FIG. 6 is a partial perspective view of another alternate embodiment of a spring clip.

In the embodiment shown in FIG. 6 a depending arm 60 is provided with a groove 62 to snap around a wire frame 46.

All versions of the spring clips shown and described herein are preferably manufactured from a continuous strip of 0.25" wide by 0.10" thick stainless steel. Punch scrap is less than 10% providing for a very economical structure. The clips reference the shroud ID in four positions and provide slack for variations in the shroud glass ID. Only two welds are necessary per mount to attach the assembly to the frame and this welding is accomplished in a single plane, thus allowing for automated welding of the assembly to the frame.

While there have been shown and described what are at present considered to be the preferred embodiments of the invention, it will be apparent to those skilled in the art that various changes and modification can be made herein without departing from the scope of the invention as defined by the appended claims.

What is claimed is:

1. An assembly for a lamp comprising:

a light source having a center and projecting, opposite ends arrayed along a longitudinal axis, said ends being cylindrical in cross-section;

a tubular shroud surrounding said light source coaxial with said longitudinal axis, said shroud having two ends, and a given wall thickness, the improvement comprising;

at least one spring clip at one end of said shroud, said spring clip comprising a base in a first plane and having an aperture centrally located therein, said aperture of said spring clip frictionally engaging one of said cylindrical ends of said light source;

said spring clip having a U-shaped projection at an end of said base comprising first and second upstanding walls, said U-shaped projection being fitted over the wall of said shroud;

a first lip extending orthogonally between said first and second walls in a second plane; and a third upstanding wall formed at the second end of said base and an extension formed with said third wall projecting away therefrom in said second plane.

2. The assembly of claim 1 wherein said assembly is positioned adjacent a frame and said extension is attached to said frame.

3. The assembly of claim 1 wherein at least one flag is formed with said extension, said at least one flag extending away from said extension in a plane transverse to said first and second planes; said assembly being positioned adjacent said frame and said flag being attached to said frame.

4. The assembly of claim 1 wherein said extension has an aperture that engages said frame.

5. The assembly of claim 4 wherein said aperture frictionally engages said frame.

6. The assembly of claim 1 wherein said extension includes a depending portion and said depending portion is formed to engage said frame.

7. The assembly of claim 6 wherein said frame comprises a wire and said depending portion is grooved to accept said frame.

8. The assembly of claim 1, 2, 3, 4, 5, 6 or 7 wherein two of said spring clips are provided, one at either end of said shroud.

* * * * *